United States Patent [19]

Rebman

[11] 4,290,203

[45] Sep. 22, 1981

[54] INSERTION COMPLIANCE DEVICE

[75] Inventor: Jack Rebman, Erie, Pa.

[73] Assignee: Lord Corporation, Erie, Pa.

[21] Appl. No.: 138,065

[22] Filed: Apr. 7, 1980

[51] Int. Cl.$^3$ .............................................. G01B 5/25
[52] U.S. Cl. .............................. 33/169 C; 33/185 R; 33/172 D
[58] Field of Search ............ 33/169 C, 180 R, 172 D, 33/185 R, 149 R, 145 J

[56] References Cited

U.S. PATENT DOCUMENTS 4,098,001 7/1978 Watson .............................. 33/169 C
4,138,824 2/1978 Ponce de Leon ................. 33/185 R
4,202,107 5/1980 Watson .............................. 33/169 C Primary Examiner—Willis Little
Attorney, Agent, or Firm—Thomas L. Kautz

[57] ABSTRACT

An insertion compliance device is provided by the present invention in which compliance means, acting in cooperation with an intermediate member, permit a pin or other mating part to translate and rotate relative to a corresponding mating part in each and every plane passing through the insertion axis of the pin to avoid binding or jamming of the parts during an automated assembly operation.

10 Claims, 11 Drawing Figures

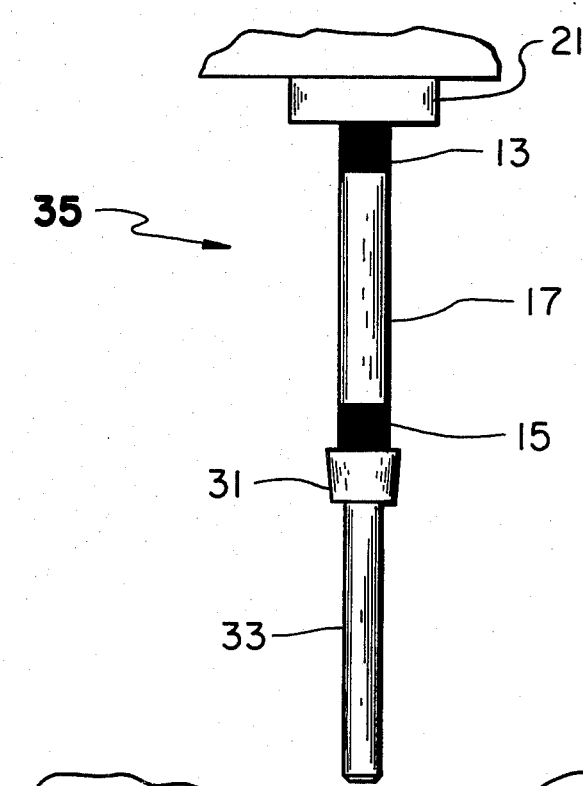
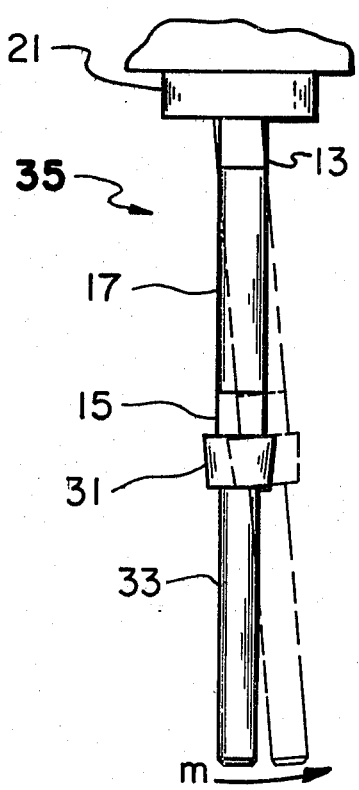
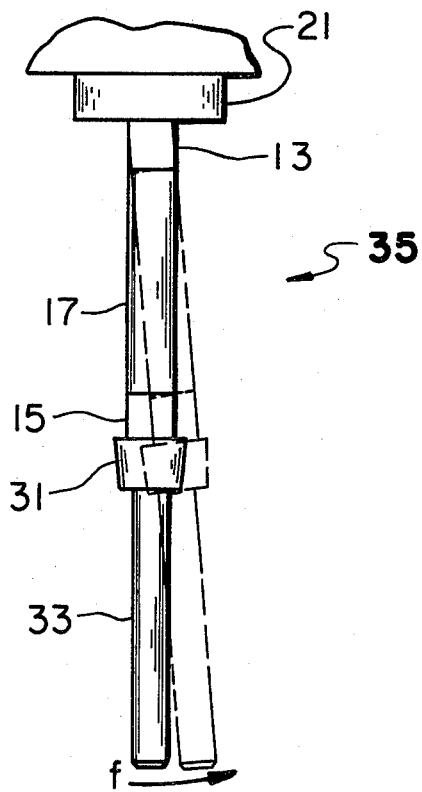
Figure 6
Figure 7
Figure 8

INSERTION COMPLIANCE DEVICE

Field of Invention

The insertion compliance device of the present invention relates to the field of automated assembly devices, and, more particularly, to aligning devices for the assembly of mating parts which are slightly misaligned.

BACKGROUND OF THE INVENTION

Development of cost effective methods of increasing manufacturing productivity is of prime concern in this country and others as soaring inflation and increasing foreign competition continues. One aspect of manufacturing which may be particularly sensitive to inflation and increased labor costs is assembly, which seldom occupies less than 10 percent of the labor in any industry and may require more than a third of the total work force in some instances. In an effort to reduce the number of man-hours devoted to assembly, automated devices have been developed for the assembly of mating parts or components in applications such as inserting a pin or a bolt into an orifice, shafts into bearings, bearings into bores and similar operations. More advanced automated assembly devices or robots may be programmable, and have been utilized to assemble more complicated items such as alternators for vehicle engines and similar "stack" products where all component parts can be added from a single direction.

Regardless of the sophistication of assembly machines, difficulties have been encountered in accommodating misalignment between machine or tooled parts in the assembly operation. Whether resulting from the design of the mating parts, through normal process variations or by unavoidable error, such misalignment can create wedging, jamming and damage to the parts during the assembly operation. Moreover, the mechanisms which deliver either one or both of the mating parts to a position for assembly may not provide precise registration of such parts relative to each other which could create further misalignment. Therefore, automated assembly devices must include means to correct misalignment between mating parts to avoid jamming or wedging and reduce excess insertion loading.

U.S. Pat. Nos. 4,098,001 to Watson and 4,155,169 to Drake et al are examples of prior art systems designed to accommodate misalignment between mating parts during assembly without manual manipulation and without excess insertion loading. The Watson and Drake et al patents discuss the problem of inserting a pin into a bore, and disclose systems wherein translational flexible elements and rotational flexible elements or compliances, cooperate to correct for both axial and angular misalignment between the pin and bore to permit assembly.

In the Watson system, shown in FIG. 1, the rotational flexible elements are disposed at an angle relative to the longitudinal axis of the pin to project the combined center of compliance of the system to a point along the axis of the pin remote from both the translational and rotational flexible elements. The system of Drake et al, shown in FIG. 2, includes rotational flexible elements having a center of compliance remote from the system such that the combined center of compliance of the translational and rotational flexible elements is located at or near the insertion end of the pin. Both the Watson and Drake et al systems require relatively precise positioning of the flexible elements and control of the magnitude of their compliance characteristics, particularly the rotational flexible elements, to accurately project the combined center of compliance to the desired location. Such design criteria increases the expense of the Watson and Drake et al devices, both in terms of the material and fabrication costs.

In addition, the Watson and Drake et al devices appear to be of limited use in operations involving the assembly of products having multiple parts of varying dimensions. As mentioned above, such devices project a combined center of compliance to a particular location relative to a pin or other mating part of given dimensions, to facilitate assembly. In operations where several parts of different dimensions are to be assembled, adjustment means would be needed in the Watson and Drake et al systems to assure that the center of compliance is properly located relative to each part. Such adjustment means would further add to the expense and complexity of these devices.

SUMMARY OF THE INVENTION

The present invention provides an insertion compliance device for aligning mating parts during assembly which is much simpler and less expensive than those of the prior art. The device herein exhibits two degrees of freedom, at least one of which is rotational, in every plane passing through the insertion axis of the pin to correct both axial and angular misalignment of the mating parts. Unlike the prior art, compensation for misalignment is accomplished by the subject invention without projecting the combined center of compliance of the device to any particular location along a pin or any other mating part. Thus, the aligning device herein may be utilized in the assembly of products having multiple components of varying dimension, without the need for adjustment or other modification.

Two embodiments of the insertion device of the present invention are provided to accommodate a wide range of fits between mating parts to be assembled. One embodiment is advantageous for use in press fits and the like, where high insertion loads may be developed in joining the mating parts. Another embodiment herein may be used in assembly operations where small insertion loads are present, such as in slip fits.

Accordingly, it is an object of the present invention to provide an alignment device for the assembly of mating parts which corrects for both axial and angular misalignment between such parts.

It is another object of the present invention to provide an alignment device which provides two degrees of freedom, at least one of which is rotational, in every plane passing through the insertion axis of the part to be inserted into a mating part.

It is a further object of the present invention to provide aligning devices having the capability of accommodating a wide range of fits between mating parts.

BRIEF DESCRIPTION OF THE DRAWINGS

Objects in addition to the foregoing will become apparent upon consideration of the following description taken in conjunction with the drawings, wherein:

FIG. 6 is a perspective view of another embodiment of the aligning device herein.

FIG. 7 is the device of FIG. 6 showing in phantom the position it assumes in reaction to the application of a pure moment at the end of the pin.

FIG. 8 is the device of FIG. 6 showing in phantom the position it assumes in reaction to the application of a pure force at the end of the pin.

DETAILED DESCRIPTION OF THE INVENTION

Figure 3:
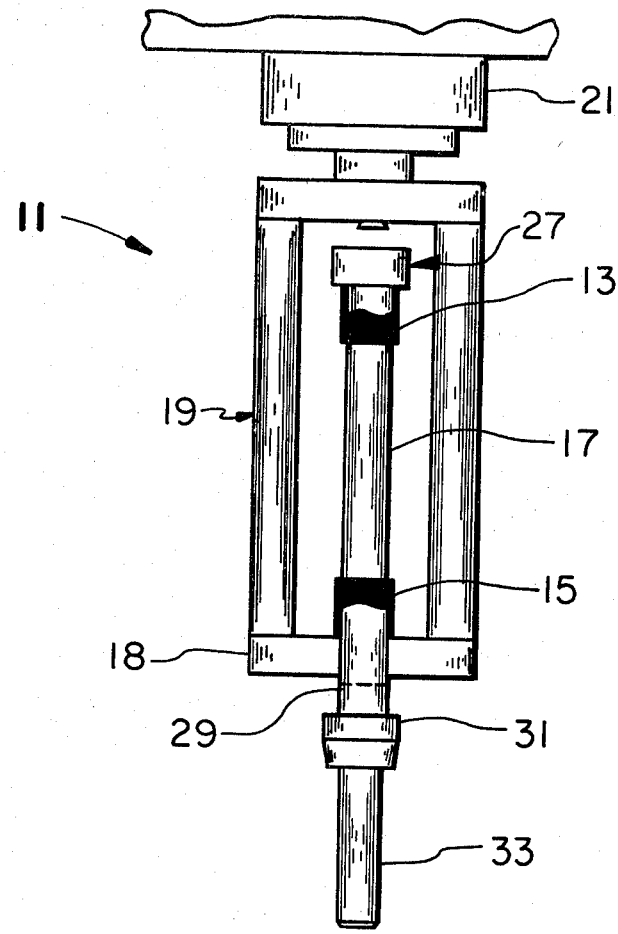
FIG. 3 is a cut away perspective view of one embodiment of the aligning device of the present invention.
Figure 4:
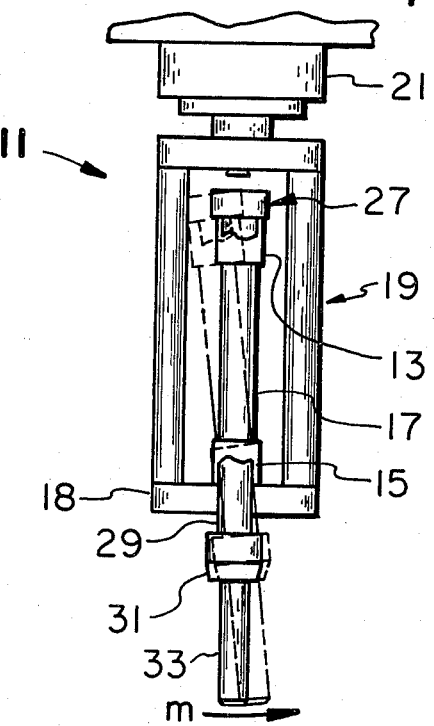
FIG. 4 is the device of FIG. 3 showing in phantom the position it assumes in reaction to the application of a pure moment at the end of the pin.

Referring now to the drawings and in particular to FIGS. 3 and 6, insertion devices of the present invention for the mating of component parts are shown. For purposes of discussion and illustration, the teachings of the present invention will be applied to the problem of inserting a pin into an opening or bore of a component part. It should be understood, however, that the invention herein is not limited to the application described, but may be utilized for the assembly of a wide variety of mating parts.

The embodiment of the subject invention shown in FIG. 3, labelled generally with the reference 11, includes an upper compliance 13 and lower compliance 15 attached to opposite ends of a link 17. Compliances 13 and 15 may be formed of an elastomer or suitable equivalent which is relatively soft in shear compared to link 17 which is formed of an essentially inextensible material such as metal, plasitc or the like. Link 17 is disposed entirely within an open rectangular-shaped frame 19, having a base member 18 to which lower compliance 15 is attached. The upper end of frame 19 is fixed to a known type of assembly machine 21, operable to translate insertion device 11 toward and away from a component part 23 having a bore 25 with a chamfer 26 formed therein (See FIGS. 9 and 10). A second rectangular frame 27, similar to frame 19, attaches at its upper end to the upper compliance 13 such that it is suspended by link 17 partially within frame 19. The base 29 of frame 27 extends below frame 19 such that base member 18 of frame 19 is disposed within frame 27. A chuck 31, or a similar adjustable holding means, attaches to the base 29 of frame 27 and is operable to receive and securely hold a pin 33 for insertion into the bore 25 of component part 23.

A second embodiment of the present invention, labelled generally with the reference 35 in FIG. 6, also includes upper and lower compliances 13 and 15, respectively, which attach to opposite ends of link 17. In this embodiment, lower compliance 15 is fixed directly to chuck 31 to receive and support pin 33, and upper compliance 13 attaches to the frame of assembly machine 21.

Before discussing the specific responses of insertion devices 11 and 35 to the forces and moments developed in an assembly operation, a general comparison can be made between the two devices. As shown in FIG. 3, the force components acting along pin 33 to oppose insertion, discussed below, place link 17 of insertion device 11 in tension during assembly operation. It has been found that insertion device 11 is advantageous in assembly operations where the mating parts are to be joined with a press fit or similar fits in which high insertion loads are present. In contrast, as shown in FIG. 6, link 17 of insertion device 35 is placed in compression during the assembly operation. Insertion device 35 is particularly useful where mating parts are joined with a slip fit or the like in which the loads or forces opposing insertion are relatively small. Thus, the present invention provides insertion devices which can accommodate a wide range of assembly applications.

Referring now to FIGS. 4, 5, 7 and 8, the behavior of the insertion device 11 and insertion device 35 under the application of a force and moment is illustrated. As discussed below, pin 33 is subjected to such forces and moments during the insertion operation into the bore 25 of component part 23 which must be accommodated by the devices 11 and 35 to avoid jamming or wedging of the pin 33.

Figure 5:
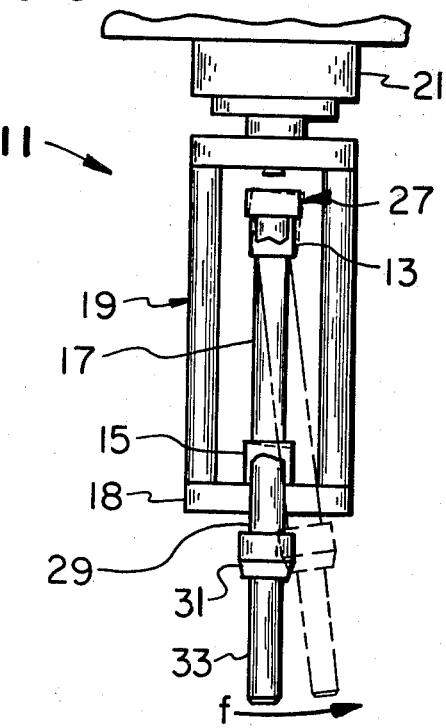
FIG. 5 is the device of FIG. 3 showing in phantom the position it assumes in reaction to the application of a pure force at the end of the pin.

A force applied to the insertion device 11, as shown in FIG. 5, results in a moment which increases linearly over the length of the device 11 from zero at the point of application of the force at the insertion end of pin 33 to a maximum at the upper compliance 13, with the lower compliance 15 having an intermediate value at the base 18 of frame 19. The lateral shear force produced, which is perpendicular to the longitudinal axis of pin 33, is constant over the length of device 11. Each of the compliances 13 and 15 exhibit both a translational shear deflection and an angular cocking deflection. The shear deflection is equal in magnitude and direction for both compliances 13 and 15, while the angular deflection of upper compliance 13 is approximately twice that of the lower compliance 15 for the dimensions of the link 17 and pin 33 shown in FIG. 5. In the deflected position of insertion device 11, shown in phantom in FIG. 5, an extension of the longitudinal or insertion axis of pin 33 passes through a point on the original undeflected position of link 17 above its midpoint, assuming the spring rates of compliance 13 and 15 are equal. The midpoint of link 17 is the center of compliance of insertion device 11.

Application of a force to the insertion end of pin 33 also produces a moment and a shear force perpendicular to the longitudinal axis of pin 33 in insertion device 35, as shown in FIG. 8. The lateral shear force is constant over the length of device 35, while the moment created increases linearly from zero at the insertion end of pin 33 to a maximum value at the assembly machine 21. In response to such shear force and moment, the upper and lower compliances 13 and 15 deflect equally in shear and the angular deflection of the upper compliance 13 will be approximately twice that of the lower compliance 15 where the length of link 17 and pin 33 are nearly equal as shown. In the deflected position of insertion device 35, shown in phantom in FIG. 8, the longitudinal axis of pin 21, if extended, passes through a point on the original position of link 17 above its midpoint. Assuming the two compliances 13 and 15 are of equal spring rate, the midpoint of link 17 is the center of compliance of the insertion device 35. Thus, in this embodiment, pin 33 in effect rotates about the center of compliance and translates as if the force was applied at the center of compliance of the entire insertion device 35.

In response to the application of a moment to the free end of pin 33 in insertion device 11 (See FIG. 4), a moment is produced over the entire length of insertion device 11 which is constant both in direction and magnitude from the insertion end of pin 33 to the upper compliance 13 and then to the lower compliance 15. Each of the compliances 13 and 15 exhibit the same cocking or angular deflection, with no shear forces being produced perpendicular to the longitudinal axis of pin 33. Assuming the spring rate of compliances 13 and 15 is equal, an extension of the longitudinal axis of pin 33 in its deflected position passes through the center of compliance of insertion device 11, which is midway along the original undeflected position of link 17.

Similarly, in response to the application of a moment to the free end of pin 33 in insertion device 35, a moment of constant magnitude and direction will result over its entire length from the insertion end of pin 33 to assembly machine 21. The shear forces perpendicular to the longitudinal axis of pin 33 are zero over the entire length of insertion device 35, causing the upper and lower compliances 13 and 15 to exhibit the same angular deflection. In the deflected position of insertion device 35 under pure moment, assuming the spring rate of compliances 13 and 15 is equal, an extension of the longitudinal axis of pin 33 passes through the midpoint of link 17 in its undeflected position, which is the center of compliance of insertion device 35. (See FIG. 7).

Figure 9:
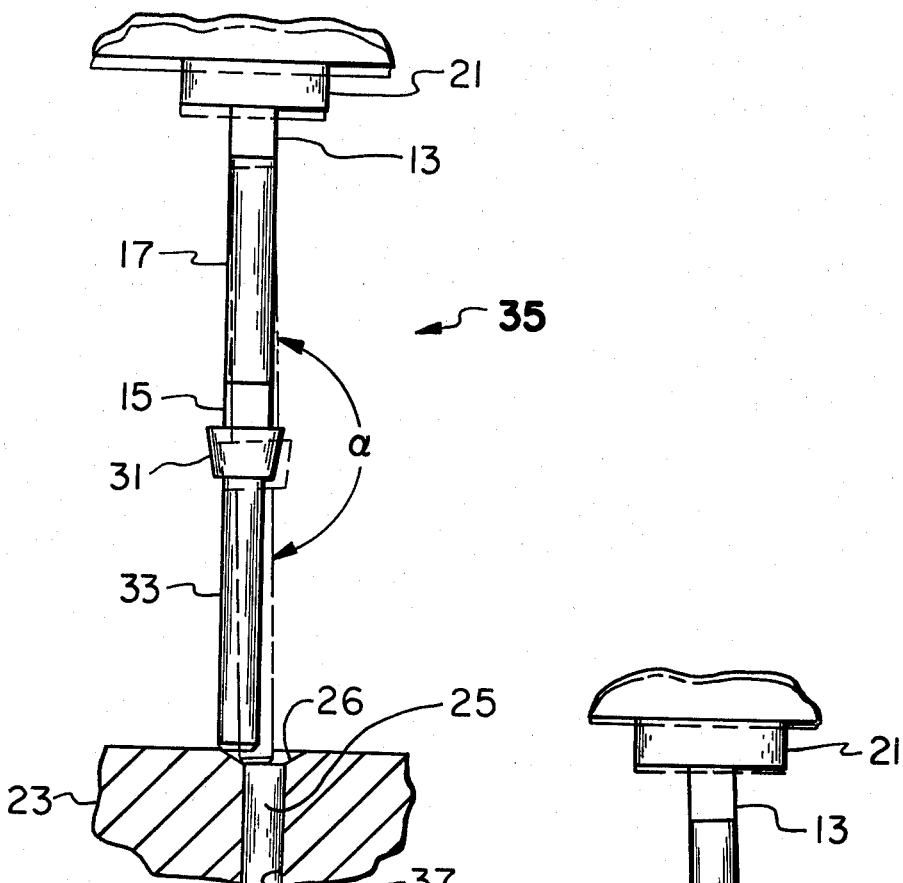
FIG. 9 is a view of the device of FIG. 6 showing in phantom the position it assumes after contacting the chamfered portion of the bore in a mating part during assembly.
Figure 10:
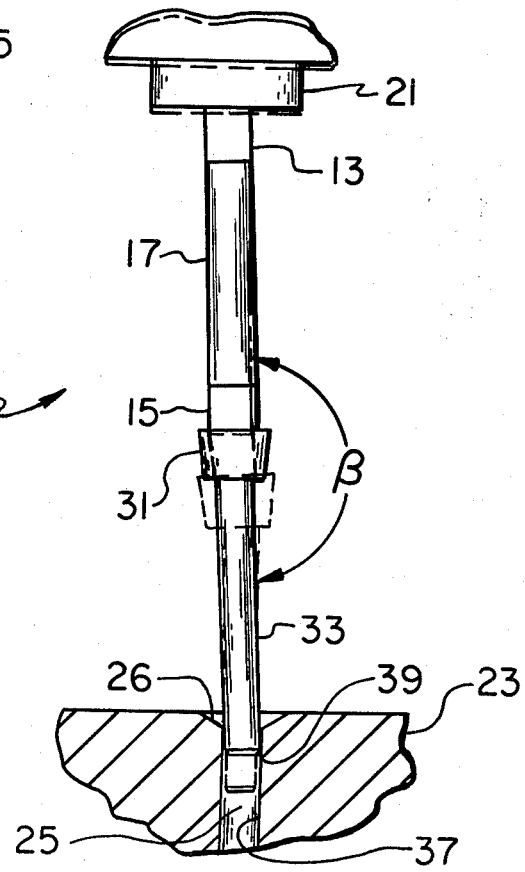
FIG. 10 is a view of the device shown in FIG. 9 as the pin is inserted further into the bore of the mating part.
Figure 11:
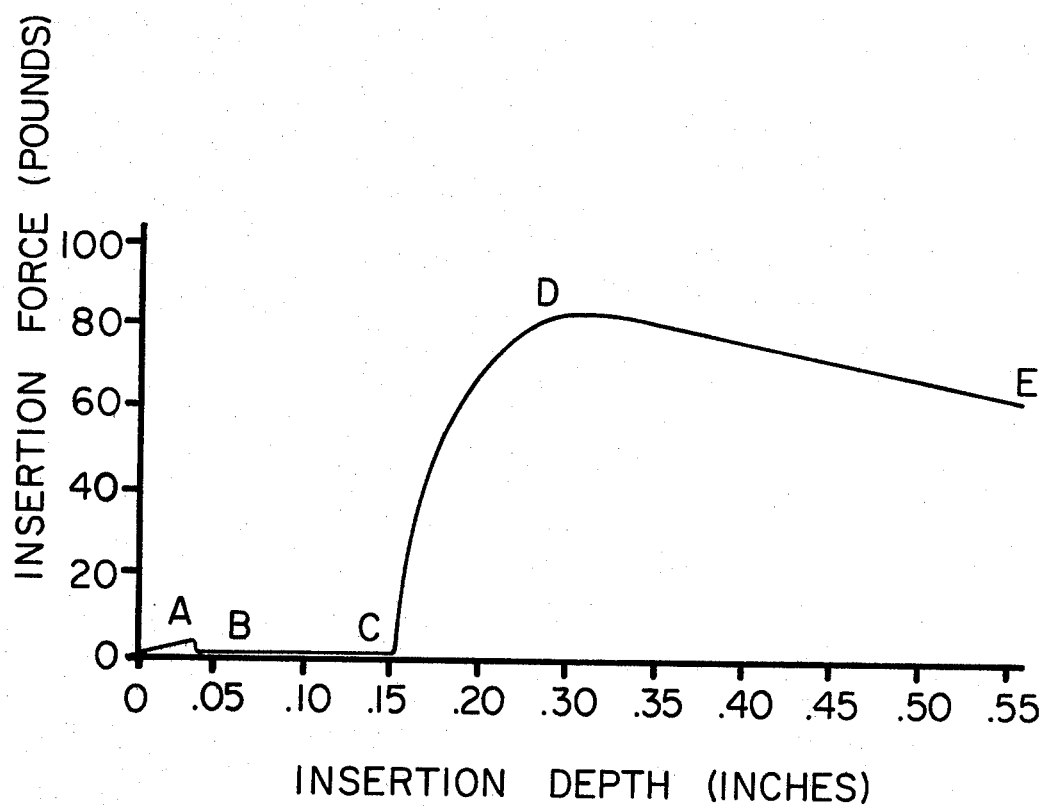
FIG. 11 is a graphical representation of the insertion force required at selected depths of insertion to avoid jamming or wedging of the pin within the bore.

Referring now to FIGS. 9, 10 and 11, the response of insertion device 35 to the forces and moments produced during the insertion operation is illustrated. The insertion operation will be described in a condition wherein there is both angular and axial misalignment of pin 33 with the bore 25 of component part 23. Of course, the present invention is also capable of accommodating assembly conditions where only angular or axial misalignment exists. As will become apparent, the axial and angular deflections of insertion device 35 in accommodating the insertion loads produced during the assembly operation are shown individually in FIGS. 7 and 8, discussed above. Thus, the behavior of insertion device 11 during the assembly operation (not shown) can be discerned from the earlier description of FIGS. 4 and 5, and the discussion of FIGS. 9–11 below.

To begin the insertion operation, assembly machine 21 moves downwardly to place pin 33 into contact with the chamfer 26 of bore 25. This initial stage of single point contact corresponds to point A in FIG. 11. The insertion load or force acting on pin 33 includes a component perpendicular to the surface of chamfer 26 urging the pin 33 laterally to the right, and a frictional component parallel to the chamfer surface 26 which resists movement of the pin 33 therealong. The lateral translation and counterclockwise rotation of pin 33 as its insertion end slides along the chamfer 26 of bore 25, produce angular and shear deflections of compliances 13 and 15 in a manner discussed above.

As insertion proceeds, the end of pin 33 slips past the lower edge of the chamfer 26 and continues at an angle toward the opposite side wall 37 of bore 25, shown in phantom in FIG. 9. Pin 33 maintains contact with the edge of chamfer 26 during this stage of single point contact, and as shown in FIG. 11 the insertion load drops (See Point B) and continues at a reduced value (See Points B to C) since the friction load between the pin 33 and the edge of chamfer 26 is essentially the only force opposing insertion. It should be noted that during the one point contact stage, either one of the compliances 13 and 15 could be locked out or eliminated without disturbing the process of insertion. The additional compliance provided in the insertion devices of the present invention is needed to accommodate the two-point contact stage, discussed below.

Referring now to FIG. 10, the insertion operation has proceeded to the two-point contact stage wherein the end of pin 33 contacts a point 39 on sidewall 37 of bore 25 and the upper portion of pin 33 continues to contact the edge of chamfer 26. At this stage of the insertion operation, further advancement of the pin 33 into bore 23 results in clockwise rotation of the pin 33 about a point between the edge of chamfer 26 and the point 39 on sidewall 37. As compliances 13 and 15 deflect to accommodate such rotation, normal forces are applied to the pin 33 at the edge of chamfer 26 and at point 39. These normal forces immediately produce friction forces which combine to form the resultant insertion load. During the initial period of two-point contact, shown by points C and D in FIG. 11, the insertion load builds rapidly. This is due to the fact that the restraining forces of compliances 13 and 15 (their resistance to deflection) produce comparatively high normal loads at the edge of chamfer 26 and point 39, over the small vertical distance between such points. As insertion progresses, the vertical distance between the edge of chamfer 26 and the end of pin 33 gradually increases to a point where the moment tending to rotate pin 33 in the clockwise direction overcomes the highest or peak normal and frictional loads opposing insertion, which occur just before point D on FIG. 11. Once the peak insertion load is overcome, the insertion load diminishes as the operation is completed. This phase of insertion is represented by the section of the curve of FIG. 11 between points D and E.

The critical load in the insertion process is the maximum on the curve of FIG. 11 adjacent point D, which occurs shortly after the two-point contact stage is initiated. The spring rate of compliances 13 and 15 must be chosen to accommodate the peak insertion load without causing wedging, jamming or damage to the mating parts. Specification of the spring rates of compliances 13 and 15 is based on such factors as the degree of angular and/or axial misalignment that can be anticipated in a particular assembly operation, the tolerances provided in the mating parts and the maximum permissible penetration loads and moments which can be sustained by the mating parts without damage. Generally, compliances 13 and 15 are made more compliant to accommodate high insertion loads without sacrificing the stabiliy of insertion devices 11 and 35.

One other factor may be considered in specifying the spring rate characteristics for the compliances 13 and 15 in insertion device 35, to accommodate the peak insertion load. As shown in FIGS. 9 and 10, in advance of the two point contact stage, lower compliance 15 is deflected in response to the counterclockwise rotation of pin 33 such that the angle $\alpha$ between the link 17 and pin 33 is less than 180°. Once pin 33 contacts point 39 to initiate two-point contact, lower compliance 15 begins to deflect in response to the clockwise rotation of pin 33. As insertion progresses between points C and D of FIG. 11, the angle $\alpha$ increases to 180° and exceeds 180° before the pin 33 reaches the condition shown at point D. Once the angle $\alpha$ between link 17 and pin 33 exceeds 180° (See FIG. 10, angle B), the force transmission through lower compliance 15 has an even greater effect on reducing the normal and frictional loads at the edge of chamfer 26 point 39 than the clockwise moment on pin 33 discussed above. Thus, the spring rates of compliances 13 and 15 in insertion device 35 may be slightly higher in certain applications to enhance system stability while accommodating anticipated insertion loads.

Figure 1:
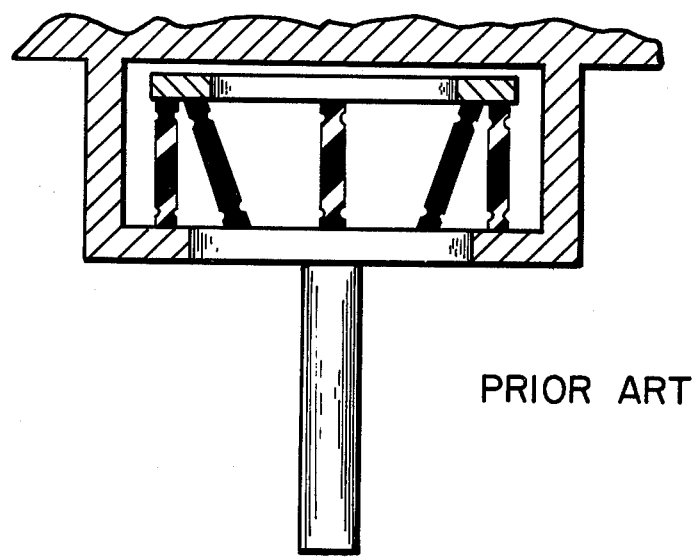
FIG. 1 is a cut away view in partial cross section of a prior art insertion compliance device.
Figure 2:
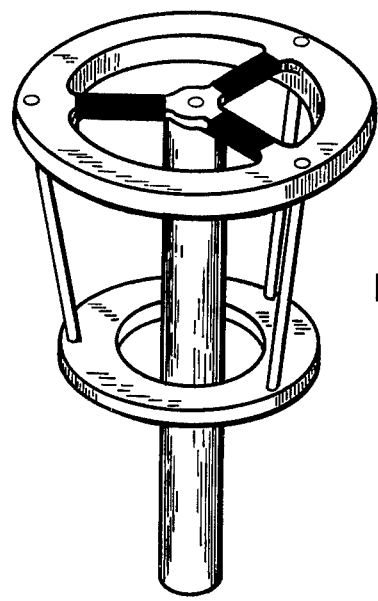
FIG. 2 is a perspective view of a second prior art insertion compliance device.

In the embodiments of the present invention, compliances 13 and 15 and link 17 provided two degrees of freedom, at least one of which is rotational, in every plane passing through the insertion or longitudinal axis of pin 33. Unlike the prior art devices shown in FIGS. 1 and 2, operation of the insertion devices herein does not depend on the projection of the combined center of compliance of the system to a point at or near the insertion end of the pin. In each of the subject embodiments, the insertion axis of the pin 33, if extended, would be colinear with the longitudinal axes of link 17 and compliances 13 and 15 in the undeflected position. The center of compliance for the upper compliance and lower compliance in each of the embodiments herein is located adjacent their respective ends of link 17. Thus, the combined center of compliance for the insertion devices of the subject invention is located along link 17, not along pin 33 as in the prior art.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An alignment apparatus for correcting axial and angular misalignment between first and second mating parts each having an insertion axis to permit assembly of said parts, comprising:
    holding means operable to hold said first mating part for assembly with said second mating part; and
    insertion means connected to said holding means, said insertion means including an intermediate member having a longitudinal axis colinear with said insertion axis of said first mating part, a first compliance means attached to one end of said intermediate member, and a second compliance means attached to the other end of said intermediate member, said first and second compliance means and said intermediate member cooperating to permit translational and rotational motion of said first mating part in every plane passing through said insertion axis thereof for continuous axial and angular alignment of said mating parts to avoid binding, jamming and damage to said mating parts during assembly.

2. The aligning apparatus of claim 1 wherein said holding means includes an adjustable chuck operable to securely hold said first mating part during assembly and release said first mating part in preparation for another assembly operation.

3. The aligning apparatus of claim 1 wherein said first and second compliance means are resilient deformable flexures.

4. An aligning apparatus for correcting axial and angular misalignment between first and second mating parts each having an insertion axis to permit assembly of said parts, comprising:
    holding means operable to hold said first mating part for assembly with said second mating part; and
    insertion means connected to said holding means, said insertion means including an intermediate member having a longitudinal axis colinear with said insertion axis of said first mating part, a first compliance means attaching to one end of said intermediate member, and a second compliance means attaching to the other end of said intermediate member, said first and second compliance means and said intermediate member cooperating to provide said first mating part with two degrees of freedom of movement at least one being rotational, said two degrees of freedom permitting translational and rotational movement of said first mating part relative to said second mating part about a combined center of compliance located along said intermediate member to permit assembly of said mating parts without binding or jamming.

5. The aligning apparatus of claim 4 wherein said two degrees of freedom of movement are both rotational.

6. The aligning apparatus of claim 4 wherein one of said two degrees of freedom of movement is rotational and the other is translational.

7. The aligning apparatus of claim 4 wherein said holding means includes an adjustable chuck operable to securely hold said first mating part during assembly and release said first mating part in preparation for another assembly operation.

8. The aligning apparatus of claim 4 wherein said first and second compliance means are resilient deformable flexures.

9. An alignment apparatus for correcting axial and angluar misalignment between first and second mating parts each having an insertion axis to permit assembly of said parts, comprising:
    holding means operable to hold said first mating part for assembly with said second mating part;
    first and second resilient deformable sections, one of said resilient deformable sections being connected to said holding means; and
    an intermediate member having a longitudinal axis, said first and second deformable sections attaching to opposite ends of said intermediate member such that said insertion axis of said first mating part aligns with said longitudinal axis of said intermediate member, said first and second deformable sections cooperating with said intermediate member to permit translational and rotational motion of said first mating part in every plane passing through said insertion axis thereof for continuous axial and angular alignment of said mating parts to avoid binding, jamming and damage to said mating parts during assembly.

10. An alignment apparatus for correcting axial and angular misalignment between first and second mating parts each having an insertion axis to permit assembly of said parts, comprising:
    holding means operable to hold said first mating part for assembly with said second mating part; and insertion means connected to said holding means, said insertion means including an intermediate member having a longitudinal axis colinear with said insertion axis of said first mating part, a first compliance means attaching to one end of said intermediate member, and a second compliance means attaching to the other end of said intermediate member, said first and second compliance means each having a center of compliance adjacent their respecitve ends of said intermediate member, said first and second compliance means and said intermediate member cooperating to permit translation and rotational motion of said first mating part in every plane passing through said insertion axis thereof about a combined center of compliance located along said intermediate member for continuous axial and angular alignment of said mating parts to avoid binding, jamming and damage to said mating parts during assembly.

* * * * *